United States Patent [19]

Woutat

[11] 4,404,927

[45] Sep. 20, 1983

[54] LEASH WITH REMOTE LATCH RELEASE

[76] Inventor: Wilson A. Woutat, 1025 Perry Dr., NW., Canton, Ohio 44708

[21] Appl. No.: 322,653

[22] Filed: Nov. 18, 1981

[51] Int. Cl.³ .............................................. A01K 27/00
[52] U.S. Cl. ..................................... 119/114; 119/111
[58] Field of Search ............... 119/114, 109, 110, 111; 24/247 R, 248 R, 247 E

[56] References Cited

U.S. PATENT DOCUMENTS

| | | | |
|---|---|---|---|
| 1,000,868 | 8/1911 | Williams | 119/114 |
| 2,737,154 | 3/1956 | Michonski | 119/109 |
| 2,821,169 | 1/1958 | Barhorst | 119/114 |

FOREIGN PATENT DOCUMENTS

| | | | |
|---|---|---|---|
| 96917 | 4/1898 | Fed. Rep. of Germany | 119/114 |
| 353013 | 5/1922 | Fed. Rep. of Germany | 119/114 |

*Primary Examiner*—Jay N. Eskovitz
*Attorney, Agent, or Firm*—Harvey B. Jacobson

[57] ABSTRACT

An elongated tether member is provided including a main elongated flexible tubular body having anchor sleeves carried by its opposite ends. One of the anchor sleeves supports anchor structure therefrom including at least one movable component shiftable between operative anchoring and inoperative release positions and an operator is shiftably supported from the other sleeve for movement between active and inactive positions. Motion transmitting structure is disposed within the tubular body establishing at least a one-way motion transmitting connection between the operator and the movable component functional to shift the movable component from the operative position to the inoperative position thereof responsive to the movement of the operator from the inactive position to the active position. An outer flexible tubular housing is disposed about the tubular member and includes opposite ends anchored relative to the sleeves. The tubular body is longitudinally stretchable and the outer flexible housing comprises a diamond braided fabric tubular member which is reduced in inside diameter as the tubular housing is longitudinally stretched. The tubular body is constructed of yieldable and deformable material whereby it defines a yieldable limit of longitudinal stretching of the tubular housing may contain an elongated flexible core member loosely disposed therein, whereby to reduce the effective inside cross sectional area of the tubular body.

6 Claims, 7 Drawing Figures

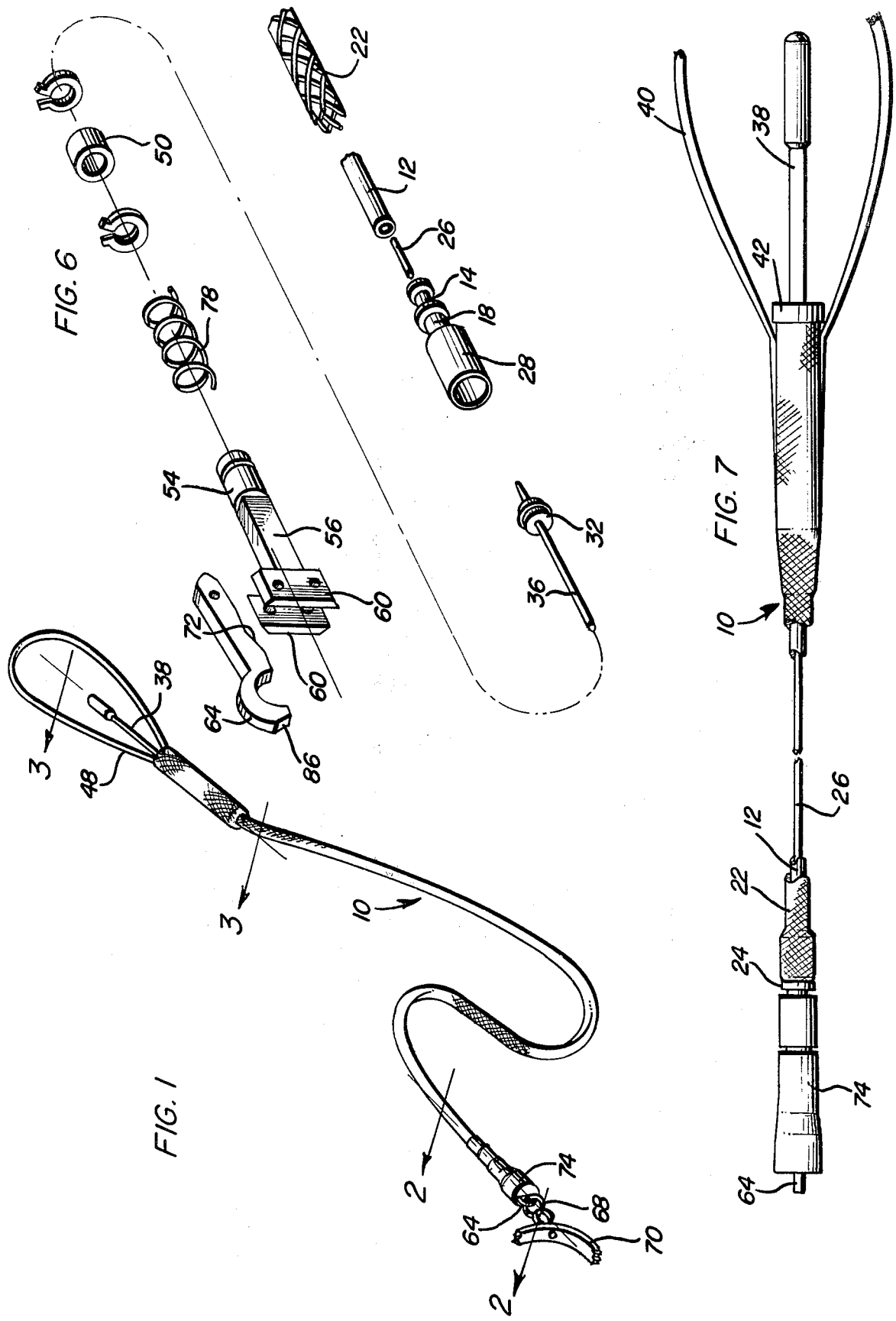

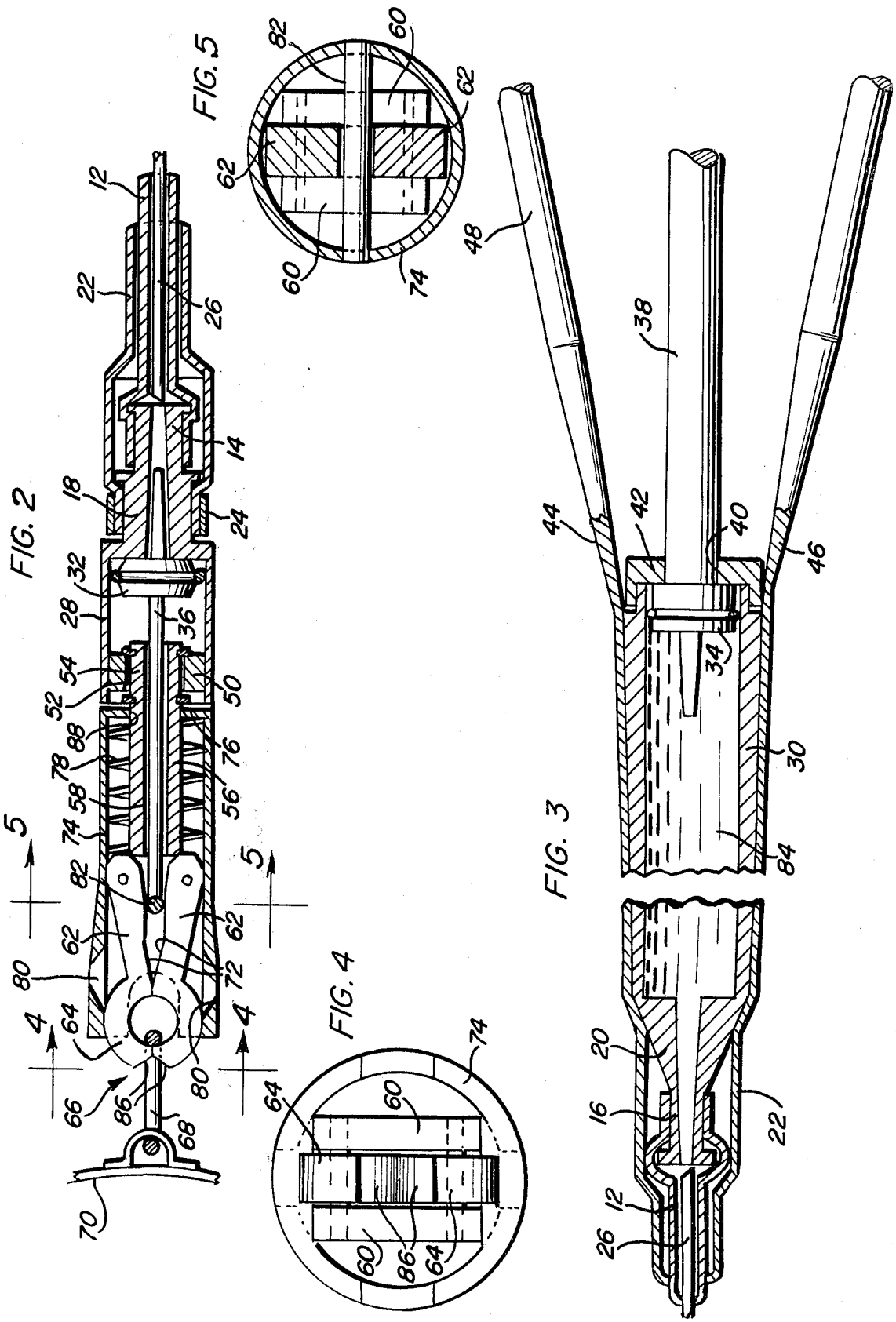

LEASH WITH REMOTE LATCH RELEASE

BACKGROUND OF THE INVENTION

Tether members such as dog leashes are conventionally constructed of substantially non-stretchable material with the result that the force of a dog making a sudden lunge is sharply transmitted to the person holding a leash by which the dog is tethered. In addition, many dogs become excited when a leash is being attached to their collar preparatory to being walked and also excited when returning home from a walk, thus making it difficult to attach a leash to a dog's collar preparatory to walking the dog and also difficult to release a leash from a dog's collar upon returning home from a walk. Accordingly, a need exists for an improved form of leash which has incorporated therein at least a minimum amount of elasticity and which further includes latching or hooking structure which may be more readily engaged with the retaining ring of a dog's collar and which may also be more readily released from the retaining ring of a dog's collar.

Examples of various forms of leashes and other tension members including some of the general structural and operational features of the instant invention are disclosed in U.S. Pat. Nos. 2,652,809, 2,821,169, 3,910,234 and 4,149,492.

BRIEF DESCRIPTION OF THE INVENTION

The leash of the instant invention includes a latch end and a handle end with the latch end being equipped with a pair of relatively pivotable jaws for releasably engaging an anchor ring of a dog collar. The jaws are received within and project slightly outwardly of a sleeve carried by the associated end of the leash and the sleeve is axially displaceable relative to the jaws between jaw locking and jaw releasing positions in which the sleeve prevents opening of the jaws and releases the jaws for movement from the closed positions to the open positions. The sleeve is spring biased toward the jaw locking position and supports a jaw opening structure engageable with the jaws to force the latter toward open positions as the sleeve is shifted from the jaw locking position to the jaw releasing position. The leash includes an elongated tubular body extending between the handle and the jaw ends thereof and the handle end of the tubular body has an operator shiftably supported relative thereto. The tubular body includes motion transmitting structure disposed therewithin establishing at least a one-way motion transmitting connection between the operator and the jaw opening structure whereby jaws may be opened remotely from the handle end of the leash. The jaw opening structure includes a piston portion slidably mounted within a cylinder portion carried by the latch end of the leash and the operator includes a piston portion slidably received within a cylinder portion defined at the handle end of the leash. The motion transmitting structure comprises a fluid column (including air) disposed within the tubular body between the two piston portions of the jaw opening structure and operator.

The main object of this invention is to provide a leash which will be longitudinally stretchable to a limited extent.

Another object of this invention is to provide a leash including latch structure on one end shiftable between locking and release positions and with the leash provided with an operator shiftably supported from the other end for remote operation of the latch structure.

Yet another important object of this invention is to provide a leash having latch structure at one end which may be readily latch-engaged with the anchor ring of the collar of a pet.

Another object of this invention is to provide a leash including a latch structure which may be remotely operated with ease from the opposite end of the leash in the event it becomes necessary to release a dog from the leash in the event of a fight with another dog.

Another object of this inventon is to provide a leash construction which may be incorporated in tether members of various other types.

A final object of this invention to be specifically enumerated herein is to provide a leash construction in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, werein like numerals refer to like parts throughout.

BRIEF DESCRIPTION OF THE DRAWINGS

FIG. 1 is a perspective view of the leash of the instant invention;

FIG. 2 is an enlarged fragmentary sectional view taken substantially upon the plane indicated by the section line 2—2 of FIG. 1;

FIG. 3 is an enlarged fragmentary sectional view taken substantially upon the plane indicated by the section line 3—3 of FIG. 1;

FIG. 4 is an enlarged transverse sectional view taken substantialy upon the plane indicated by the section line 4—4 of FIG. 2;

FIG. 5 is an enlarged transverse sectional view taken substantially upon the plane indicated by the section line 5—5 of FIG. 2;

FIG. 6 is an exploded perspective view of some of the working components of the instant invention illustrated in FIG. 2; and FIG. 7 is a fragmentary top plan view of the leash.

DETAILED DESCRIPTION OF THE INVENTION

Referring now more specifically to the drawings, the numeral 10 generally designates the leash of the instant invention. The leash 10 includes a main elongated and flexible tubular body 12 having its opposite ends telescoped over flanged reduced ends 14 and 16 of cylinder sleeves 18 and 20. In addition, the leash 10 or tether member, includes an outer flexible tubular housing 22 constructed of a diamond braided fabric and the opposite ends of the tubular housing 22 are telescoped over sleeves 14 and 16, a clamp 24 being utilized to secure one end of the tubular housing 22 over the sleeve 18. Still further, an elongated flexible core member 26 constructed of resilient material is loosely disposed in and extends substantially the full length of the tubular body 12.

The sleeves 18 and 20 include diametrically enlarged remote ends 28 and 30 having seal ring equipped pistons 32 and 34 slidably disposed therein. The piston 32 includes a forwardly projecting piston rod portion 36 which extends forwardly through the forward end of the sleeve 18 and the piston 34 includes a rearwardly projecting piston rod portion 38 which is slidably received through a central aperture 40 formed in an end cap 42 secured over the rear end of the sleeve 20 remote from the tubular housing 22. The end of the tubular housing secured over the sleeve 20 is divided at the rear end of the sleeve 20 into a pair of loop defining ends 44 and 46 secured together by a loop member 48.

The end of the sleeve 18 remote from the tubular housing 22 has an annular end wall 50 secured therein defining a cylindrical bore 52 extending therethrough. A cylindrical end 54 of a square shank 56 is rotatably received through the bore and the shank 56 finds a longitudinal central bore 58 extending axially therethrough in which the end of the piston rod portion 36 remote from the piston 32 is slidably received. The end of the shank 56 remote from the cylindrical end 54 includes a pair of laterally spaced apart opposite side mounting plate portions 60 between which the base ends of a pair of jaw hooks 62 are pivotally supported, the free ends of the jaw hooks 62 including one-half cylindrical jaw members 64 supported therefrom which together define a latch ring referred to in general by the reference numeral 66 engageable with the anchor ring 68 carried by a dog collar 70. The opposing sides of the jaw hooks 62 include oppositely inclined cam surfaces 72 and a locking sleeve 74 has one end thereof equipped with a centrally apertured end wall 76 slidingly telescoped over the cylindrical shank 56. A coiled compression spring 78 is disposed about the cylindrical shank 56 between the end wall 76 and the mounting plate portions 60 and yieldingly biases the sleeve 74 to the right relative to the square shank 56 as viewed in FIG. 2. The jaw halves 64 project partially outwardly of the end of the sleeve 74 remote from the end wall 76 and opposite side portions of the sleeve 74 define inwardly opening recesses 80 in which the remote sides of the jaw members 64 are receivable when the sleeve 74 is shifted to the left as viewed in FIG. 2 of the drawings against the biasing action of the spring 78. An intermediate portion of the sleeve 74 includes a diametric pin 82 engageable by the end of the piston rod portion 36 remote from the piston 32.

The interior of the tubular body 12 is filled with a fluid 84 constituting motion transmitting means between the pistons 34 and 32. Accordingly, upon inward displacement of the piston rod portion 38, the piston rod portion 36 will be displaced to the left as viewed in FIG. 2 of the drawings and the free end of the piston rod portion 36 will engage the cross pin 82 and thus shift the sleeve 74 to the left in order to register the recesses 80 with the remote sides of the jaw members 64 while at the same time causing the pin 82 to engage the cam surfaces 72 and spread the jaw members 64 apart so as to release the anchor ring 68.

In addition, when it is desired to engage the jaw members 64 with the anchor ring 68, the anchor ring 68 is held in one hand and the other hand is engaged with the sleeve 74 in order to displace the sleeve 74 toward the anchor ring 68 while the latter is engaged by cam surfaces 86 on the jaw members 64 whereupon the recesses 80 are registered with the remote sides of the jaw members 64 and the anchor ring 68 may cause jaw members 64 to be spread apart by engagement with the cam surfaces 86.

Accordingly, it may be seen that the jaw members 64 may be released from engagement with the anchor ring 68 from the remote end of the leash 10 and may be readily engaged with the anchor ring 68 when desired. Further, inasmuch as the sleeve 56 includes the cylindrical end 54 and the square sleeve 56 is slidably received through the central square opening 88 formed in the end wall 76 of the sleeve 74, the sleeve 74 may be angularly displaced about its longitudinal axis in order to properly register the jaw members 64 with the anchor ring 68 in order to facilitate engagement of the anchor ring 68 by the jaw members 64.

Inasmuch as the tubular housing 22 is constructed of diamond braided fabric material, the tubular housing 22 may be somewhat longitudinally stretched. However, when the housing 22 is longitudinally stretched it is reduced in inside diameter and is thus caused to frictionally grip tubular body 12. Inasmuch as the latter is constructed of resilient material, the tubular body 12 yieldingly limits reduction of the inside diameter of the tubular housing 22 and thus longitudinal stretching of the housing 22. Further, the core 26 enables the tubular body 12 to be of reasonably large diameter while still maintaining the effective cross sectional area of the fluid column 84 defining a connection between pistons 32 and 34 at a minimum.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An elongated tether member including a main elongated flexible tubular body, an anchor sleeve carried by each end of said body, one of said anchor sleeves supporting anchor structure therefrom including at least one movable component thereof shiftable between operative anchoring and inoperative release positions, an operator shiftably supported from the other sleeve for movement between active and inactive positions, and motion transmitting means disposed within said tubular body establishing at least a one-way motion transmitting connection between said operator and movable component functional to shift the latter from the operative position to the inoperative position thereof responsive to movement of said operator from said inactive position to the active position thereof, said tether member including an outer flexible tubular housing disposed about said tubular member and including opposite ends anchored relative to said sleeves, said tubular body being longitudinally stretchable, said outer flexible tubular housing comprising a diamond braided fabric tubular member, said fabric tubular member being longitudinally stretchable a limited amount and being constructed in a manner whereby it is reduced in both inside and outside diameter as it is longitudinally stretched, said tubular body establishing a limit of reduction of the inside diameter of said tubular member and thus a limit of longitudinal stretching of said tubular housing, said tubular body being constructed of yieldable and deformable material whereby said tubular body defines a yieldable limit of longitudinal stretching of said tubing housing, said motion transmitting means including piston means in each of said sleeves and fluid column means disposed in said tubular body acting upon said piston means.

2. The tether member of claim 1 including an elongated flexible core member loosely disposed in an extending through at least substantially the full length of said tubular body.

3. The tether member of claim 1 wherein said anchor structure, as a whole, is rotatably supported from said one sleeve for angular displacement relative thereto about an axis generally concentric with said one sleeve.

4. The tether member of claim 1 wherein said anchor structure includes a pair of openable and closable jaws supported therefrom and each of said jaws comprises a movable component of said anchor structure.

5. The tether member of claim 8 wherein said anchor structure also includes third and fourth movable components thereof, said third component including block means shiftable between first and second locking and releasing positions and means operative to lock said jaws in the closed position thereof when said lock means is in the locking position thereof and inoperative to lock said jaws in the closed positions when in the release position thereof, said fourth component being shiftable between active and inactive positions and displaceable, by said motion transmitting means, to the active position thereof upon movement of said operator to its active position, said fourth component, upon movement to said active position, being operative to shift said lock means to the inoperative position and said jaws to said open positions.

6. The tether member of claim 5 wherein said anchor means includes means operative to yieldingly bias the said third component to said locking position.

* * * * *